May 5, 1970     R. W. NEUZIL ET AL     3,510,423
OLEFIN SEPARATION PROCESS
Filed April 5, 1968
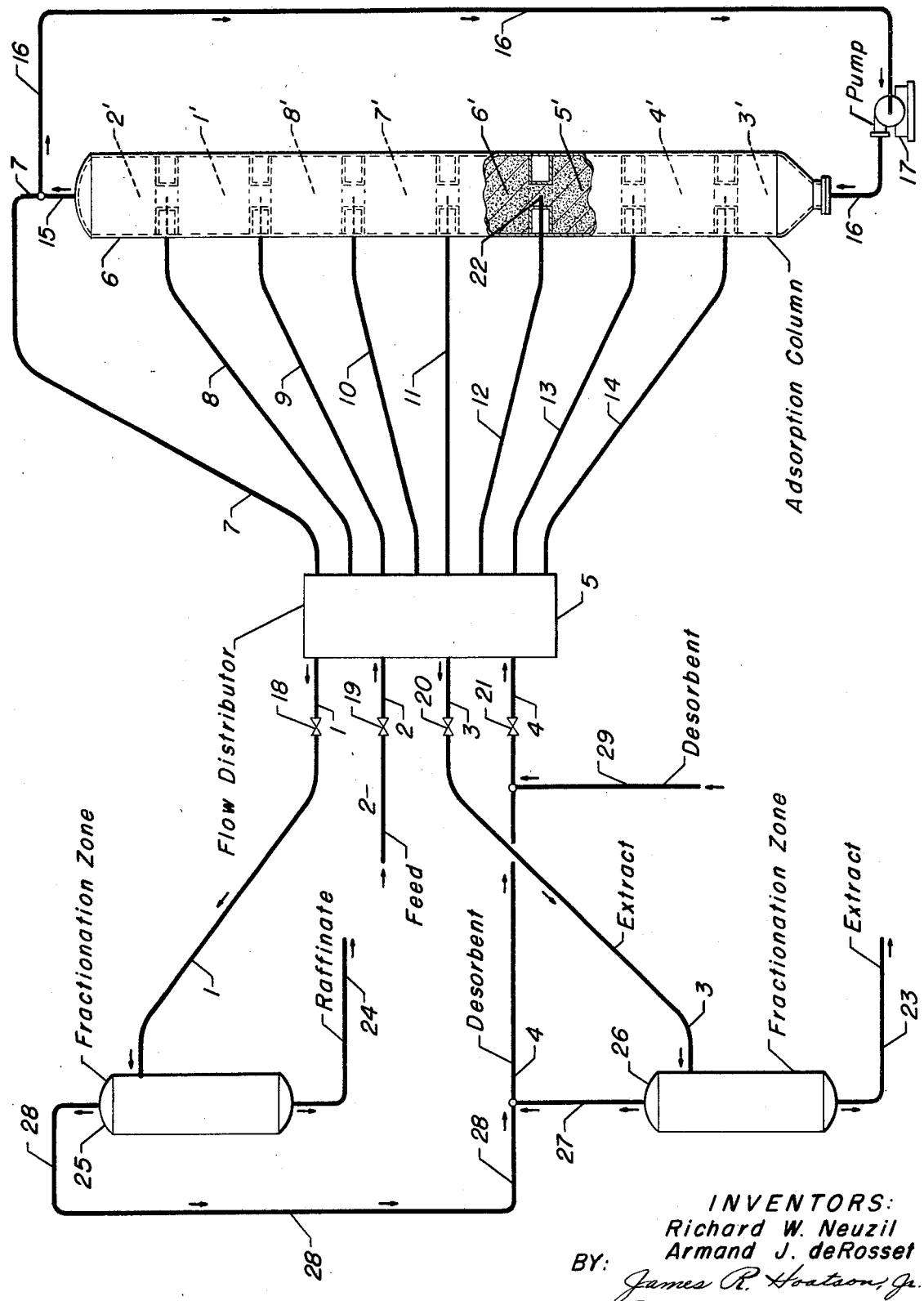
INVENTORS:
Richard W. Neuzil
Armand J. deRosset
BY: James R. Hoatson, Jr.
Robert W. Erickson
ATTORNEYS United States Patent Office 3,510,423
Patented May 5, 1970

3,510,423
OLEFIN SEPARATION PROCESS
Richard W. Neuzil, Downers Grove, and Armand J. De Rosset, Clarendon Hills, Ill., assignors to Universal Oil Products Company, Des Plaines, Ill., a corporation of Delaware
Filed Apr. 5, 1968, Ser. No. 719,089
Int. Cl. C10g 25/04; C07c 11/02
U.S. Cl. 208—310                                14 Claims

ABSTRACT OF THE DISCLOSURE

An isothermal, continuous, simulated moving bed process for the separation of olefins from a paraffin containing feed mixture. The adsorbent utilized in said process comprises a crystalline aluminosilicate.

BACKGROUND OF THE INVENTION

Field of invention

The invention described hereinafter relates to a process for the separation of olefins from mixed hydrocarbon streams. More specifically, this invention relates to a continuous, simulated moving bed separation process wherein straight or branched chain olefins are separated from a hydrocarbon mixture comprising straight chain paraffins through the use of a crystalline aluminosilicate adsorbent. The continuous shifting of inlet and outlet streams through a series of fixed beds of adsorbent allows the adsorbent to selectively adsorb olefin yielding an extract stream which is enriched in olefinic hydrocarbons.

Description of prior art

It is well known in the separation art thta molecular sieves can be employed to separate branched chain hydrocarbons from straight chain hydrocarbons, aromatic hydrocarbons from branched or straight chain hydrocarbons, etc. Separation of olefins from paraffins can be effected through the use of selected modified molecular sieve adsorbents in the process as disclosed in U.S. Pats. 2,071,-993 (Cl. 260–677) and 23,265,750 (Cl. 260–666). The adsorbents employed in these separation processes are generally crystalline aluminosilicates modified with a metal selected from the group of silver, potassium, barium, cobalt, etc. The method of the former separation process discloses alternately passing feed, paraffin and polar desorbent streams or feed, paraffin, olefin and paraffinic desorbent streams through a bed of adsorbent to selectively separate olefinic and paraffinic hydrocarbons. It is suggested in this patent that the process be operated in a parallel swing bed manner to achieve a substantially continuous overall operation. The use of a polar liquid as one of the possible desorbents would suggest that the adsorbent bed requires phase change purges (vapor desorption) to remove the polar liquid.

The method of the later separation process discloses vapor phase operation of a swing bed system wherein desorption of the selectively adsorbed olefins is accomplished through a temperature increase with a gas purge to the adsorbent bed.

The method of our invention comprises a continuous liquid phase operation wherein the adsorbent beds are serially connected and kept essentially under isothermal and constant pressure conditions and in these respects differs substantially from what has been discussed as available prior art. Our invention as will hereinafter be described relies on the critical choice of adsorbent and an adsorbent to effect suitable operation of the process. The important parameters considered involve the adsorbent-feed and adsorbent-desorbent equilibria for efficient separation of olefins and paraffins in the process of this invention.

SUMMARY OF INVENTION

It is an object of this invention to separate olefins and paraffins while eliminating polymerization of the olefins. It is a further object of this invention to operate the separation process in a liquid phase under essentially isothermal and constant pressure conditions and to employ a preferred adsorbent material in said process. It is a still further object of this invention to provide a continuous, simulated moving bed process to provide the necessary purity of the selectively sorbed olefin extract stream and the less selectively sorbed paraffin raffinate stream. It is a still further object of this process to separate straight chain olefins from mixtures comprising paraffins.

In defining particular terms used in this specification and accompanying claims, a clear understanding of the process of this invention is made possible. In defining "an isothermal process" we refer to the adsorption column and require that for this mode of operation that differences in temperature throughout the adsorbent beds be less than about 10° C. Again referring to the adsorption column, differences in pressure at various locations throughout the adsorbent beds tend to allow liquid flow into, out of, and through the column adsorbent beds, and that these differences in pressure are less than about 50 p.s.i.

The process is said to be "continuous" in that the individual beds in the adsorption column are in constant use and that the beds are connected and at no time are isolated from the other beds of the adsorption column.

In referring to the selectivity of the adsorbent for one component over another the selectivity (B) is defined as the ratio of the concentrations of the components adsorbed within the adsorbent over the ratio of the components in the external liquid phase at substanially equilibrium conditions. The selectivity (B) for the olefin in the feed over the desorbent may be expressed as $$B = \frac{\frac{F}{D}}{\frac{F'}{D'}}$$

where:

F is the concentration of the feed olefins adsorbed within the adsorbent,
D is the concentration of the desorbent adsorbed within the adsorbent,
F' is the concentration of the feed olefins in the external liquid phase, and
D' is the concentration of the desorbent in the external liquid phase.

In measuring the B of a particular adsorbent for two given components the two components are contacted with an adsorbent bed for a period of time necessary for the adsorbent to substantially completely adsorb the two components. The external liquid phase is removed from the adsorbent bed and analyzed for the concentration of the two given components. The adsorbent bed is then purged of excess external liquid and then the adsorbed components are desorbed by a third component or by a vacuum, desorption step. The desorbed component are then analyzed for the concentration of the two given components. The two sets of component concentrations are then used to determine the selectivity of the adsorbent for the two given components.

The process of the present invention may be understood more clearly by referring to the attached figure. Adsorption column 6 contains a molecular sieve adsorbent. A preferred material for the adsorbent comprises a crystalline aluminosilicate which has been cationically modified so as to contain certain selected metals as part of the crystal structure of the sieve.

Referring to the attached figure, a detailed explanation of the process of the present invention is now given. Lines 1, 2, 3 and 4 are connected to flow director 5 and have flow controlling valves 18, 19, 20 and 21 attached for independent control of the individual raffinate, feed, extract and desorbent flow rates. Line 2 carries the feed to the flow director and subsequently to adsorption column 6. The feed flowing through line 2 into the flow director comprises paraffins and olefins. The olefins preferably contain from about 10 to about 20 carbon atoms per moleclue with the paraffins preferably being in the same carbon number range. A common source of feed for the process of this invention is from catalytic dehydrogenation process as wherein a paraffinic feed is dehydrogenated to give an olefinic hydrocarbon product. This product generally contains a mixture of both unreacted paraffins and the olefins and requires a further separation step to recover a stream of concentrated olefins.

Line 1 of the attached figure carries the relatively less sorbed components of the feed which comprises the paraffinic hydrocarbons. The less selectively sorbed component of the feed (raffinate material) flows through line 7 from column 6 at a rate which is controlled by valve 18. The raffinate material flowing from column 6, in addition to paraffinic hydrocarbons, comprises desorbent material which was displaced from the sorbent by the normal olefins in the feed. The raffinate material flowing from column 6 is separated by fractionation zone 25 to yield desorbent and normal paraffin fractions; the desorbent is recycled to line 4 via line 28 for reuse and the paraffinic hydrocarbon is collected as product from line 24. The raffinate material can be processed further in reforming, isomerization, cracking or dehydrogenation processes.

Line 3 of the attached figure carries extract material from column 6 at a rate controlled by valve 20. The extract material comprises feed-olefins and desorbent material and is a resultant stream formed by displacement of adsorbed feed olefins by the desorbent stream flowing through line 4. The extract stream flowing through line 3 is separated into an olefin product stream and a desorbent stream in fractionation zone 26. The feed olefin is recovered as proluct from line 23 and desorbent material is preferably recycled to line 4 via line 27 for reuse.

Line 4 of the attached figure carries desorbent material to adsorption column 6 at a rate controlled by valve 21. Line 29 is connected to line 4 and supplies desorbent from an external source as is needed.

Flow director 5 of the attached figure connects lines 1, 2, 3 and 4 to lines 7, 8, 9, 10, 11, 12, 13 and 14 which are connected to column 6. Lines 7 through 14 enter the column 6 through ports that are located between the eight individual fixed beds in a preferably narrow portion of the column 6. For example, line 12 enters the column 6 through port 22 between beds 5' and 6'. Flow director 5 can comprise a multi-valve manifold arrangement, a rotary multiport valve or any other suitable flow directing mechanism that will, in a programmed manner, direct flow of the feed (line 2) and desorbent (line 4) streams into he column and the raffinate (line 1) and extract (line 3) streams out of the column.

As shown in the attached figure, the feed flows through line 2 to flow director 5 wherein the feed is sent through line 9 to column 6; the desorbent flows through line 4 to the flow director which sends the desorbent through line 13 to the column; the raffinate stream flows from column 6 through line 7 to the flow director wherein the raffinate stream is sent through line to fractionation facilities 26; the extract stream flows from the column through line 11 to the flow director which sends the extract stream through line 3 to fractionation facilities 26. The streams flowing into and out of the process as described above comprise a single cycle (cycle 1 of Table I) of an operation which will vary in length of time according to the feed composition, required product purity, sorbent properties, etc.

Table I below indicates the locations of the feed, raffinite, extract and desorbent streams during the individual cycles used in the continuous operation of column 6.

TABLE I.—FLOW DISTRIBUTOR PROGRAMMED OPERATION

| Cycle | Lines through which material is flowing. (See attached figure) | | | | | | | |
|---|---|---|---|---|---|---|---|---|
| | 7 | 8 | 9 | 10 | 11 | 12 | 13 | 14 |
| 1 | R |   | F |   | E |   | D |   |
| 2 |   | F |   | E |   | D |   | R |
| 3 | F |   | E |   | D |   | R |   |
| 4 |   | E |   | D |   | R |   | F |
| 5 | E |   | D |   | R |   | F |   |
| 6 |   | D |   | R |   | F |   | E |
| 7 | D |   | R |   | F |   | E |   |
| 8* |   | R |   | F |   | E |   | D |

R—Raffinate stream. D—Desorbent stream. E—Extract stream. F—Feed stream.
*Cycle 8 is the last cycle in completing one sequence of operations. After cycle 8 is completed, cycle 1 is started.

As can be seen in Table I, the raffinate, feed, extract and desorbent streams that flow to column 6 are advanced equally in the same direction when advancing to the next cycle of operations. It should be understood that any number of cycles greater than four may be used and that the number of cycles required for one complete sequence of operations depends on the number of individual inlet-outlet ports that the column contains.

As can be seen in Table I, there are four of the total of eight lines entering the column 6 that are in use during a given cycle. For example, in cycle 1 of Table I, lines 7, 9, 11 and 13 are in use while lines 8, 10, 12 and 14 are not being used. The flow distributor 5 is constructed in a manner so that the lines not having material flowing through them during a given cycle, i.e. lines 8, 10, 12 and 14 of cycle 1, are plugged or blocked off at either or both the flow director or column ends thereby stopping flow through these lines. In this manner of selected flow in and out of column 6 in predetermined cycles, a simulated countercurrent moving bed operation is effected in column 6.

The adsorption column 6 of the attached figure is a plurality of serially connected fixed beds sorbing affinity for olefins than for corresponding paraffins of the same carbon range. Column 6 contains eight fixed beds numbered 1' through 8' with the terminal beds (beds 2' and 3') connected by lines 15 and 16. Pump 17 in line 16 provides a means for circulating liquid from the top of column 6 to the bottom thereof. The pumparound system gives the fluid in column 6 a unidirectional flow which relative to the stationary solid sorbent in the eight beds of column 6 flows from bed 3' to bed 2' via beds 4', 5', 6', 7', 8' and 1'. Relative to bed 3', bed 4' is in a downstream direction; relative to bed 4', bed 3' is in a upstream direction by virtue of the direction of fluid flowing through the separate beds.

To reduce the operation of the adsorption column to relatively simplified terms, the column can be thought to be operating in continuous counter flow of liquid and said adsorbent with the overall separation of olefins and paraffins being effected by four separate zones.

Zone I is the series of beds located between the port of feed introduction downstream to the port of raffinate withdrawal; zone II is the series of beds located between the port of extract withdrawal downstream to the port of feed introduction; zone III is the series of beds located between the port of desorbent introduction downstream to the port of extract withdrawal; and, zone IV is the series of beds located between the port of raffinate withdrawal downstream to the port of desorbent introduction. As mentioned previously, the ports of feed and desorbent introduction and the ports of raffinate and extract withdrawal are advanced equally and essentially simultaneously in a downstream direction (Table I). Consequently, zones I, II, III and IV are advanced equally and simultaneously in a downstream direction as the inlet and outlet ports are so advanced.

Table II shows the location of the individual zones through out the series of beds in the adsorption column for the individual cycles used in the continuous operation of the adsorption column.

TABLE II.—ZONE POSITIONS IN THE ADSORPTION COLUMN FOR VARIOUS CYCLES OF OPERATION

| Cycle* | 1 | 2 | 3 | 4 | 5 | 6 | 7 | 8 |
|---|---|---|---|---|---|---|---|---|
| Adsorbent bed in column: | | | | | | | | |
| 1' | I | II | II | III | III | IV | IV | I |
| 2' | I | I | II | II | III | III | IV | IV |
| 3' | IV | I | I | II | II | III | III | IV |
| 4' | IV | IV | I | I | II | II | III | III |
| 5' | III | IV | IV | I | I | II | II | III |
| 6' | III | III | IV | IV | I | I | II | II |
| 7' | II | III | III | IV | IV | I | I | II |
| 8' | II | II | III | III | IV | IV | I | I |

*Cycles 1-8 are identical to the cycles of Table I.

In zone I olefins in the feed are adsorbed by the solid adsorbent displacing the previously adsorbed desorbent. During the normal course of operation zone I is shifted as previously described. In using zone 1 as a reference point, when zone I shifts to the next bed position (Table II) the solids that leave zone I enter zone II. The absorbent that is entering zone II carries olefins adsorbed from the feed and other hydrocarbons comprising paraffins from the feed. In zone II the paraffins from the feed and most other nonolefinic hydrocarbons are displaced from the solid by desorbent. Any olefinic hydrocarbons from the feed that is desorbed from the absorbent in zone II is readsorbed in zone I. The adsorbent in zone III carries primary olefins from the feed and some desorbent and is contacted with a large excess of desorbent which displaces all of the olefins from the feed that were sorbed on the adsorbent. When zone III shifts to its new location in the adsorption column the absorbent that leaves this zone carries primary desorbent which can be made available for reuse in zone III by contacting the adsorbent with a portion of the raffinate. In zone IV the displacing of desorbent by raffinate material is accomplished. The raffinate flow rate into zone IV is controlled so that the raffinate material flowing into zone IV is completely adsorbed.

In starting the process, a feed stock such as the paraffin and olefin mixture charged into the process flow through line 2, at a rate controlled by valve 19, through flow director 5 and into line 9 which carries the feed into the column at the port located at the preferably narrow portion of the column located between beds 1' and 8'. The feed entering the column through the port of line 9 flows in a downstream direction into bed 1' wherein the olefins in the feed and some paraffins are adsorbed by the solid adsorbent. Simultaneously, the desorbent present in the solid adsorbent pores from a previous cycle of operation is displaced from the adsorbent. The less strongly adsorbed paraffins occupy the void spaces between the solid particles of the adsorbent and eventually flow downstream towards bed 2' and to line 7 which allows a portion of the raffinate stream (paraffin and desorbent mixture) to be withdrawn from the column via line 7, the flow director 5 and line 1. The solid adsorbent in bed 1' which contains, in addition to adsorbed normal olefins, a considerable quantity of heavy paraffins which can be displaced from the adsorbent by desorbent which from a prior cycle is contained in upstream beds 7' and 8'. The paraffins which are displaced from the solid adsorbent in bed 1' by desorbent material flow in a downstream direction towards bed 2'. Unavoidably, some of the olefins adsorbed on the solid adsorbent in bed 1' are displaced at the same time. The flow rate of liquid flowing into bed 1' from bed 8' can be adjusted to displace substantially all of the heavy paraffins adsorbed by the adsorbent in beds 1' and 2', without simultaneously washing out all of the more tenaciously adsorbed olefins. Any olefins which are desorbed in bed 1' are readsorbed in bed 2'.

The normal paraffin hydrocarbon material, together with desorbent material are the principal materials withdrawn from bed 1', passing by the port of line 8 and entering bed 2' wherein any olefins in the material entering bed 2' can be adsorbed. The stream passing out of bed 2' through line 15 comprises principally the non-sorbed paraffins and desorbent. A portion of the fluid effluent from bed 2' in line 15 passes through line 7 to flow director 5 and through the raffinate line 1; the raffinate flow rate out of the column is controlled by valve 18 in line 1. The remaining portion of effluent from bed 2' flows through line 16 into bed 3'. Line 16 connects the terminal beds 2' and 3' and allows continuous unidirectional flow of liquid through the column.

The solid adsorbent in beds 3' and 4' contains within its pores essentially only adsorbed desorbent which is present from a previous cycle of operation. The raffinate material flowing through line 16 to bed 3' comprises primarily paraffins which are adsorbed on the adsorbent in bed 3' displacing desorbent material downstream to bed 4' and bed 5'. The flow rate of the raffinate material into bed 3' is adjusted so that heavy paraffins are completely adsorbed on the adsorbent before reaching the outlet of bed 4'. Otherwise, the paraffins would contaminate the olefinic product in the extract stream.

The solid adsorbent in beds 5' and 6' contains adsorbed olefins and desorbent from a previous cycle of operations. The adsorbed olefins, which have been selectively adsorbed from the feed, are displaced by desorbent material flowing through line 4, at a rate controlled by valve 21, to the flow distributor, through line 13 and out of the port of line 13 between beds 4' and 5'. The desorbent upon entering the column flows in a downstream direction into beds 5' and 6' displacing the olefinic product. The desorbent and olefinic material which comprises the extract stream flows out of column 6 at the port between beds 6' and 7' through line 11 to the flow distributor 5 and through line 3 at a rate controlled by valve 20 in line 3. A portion of the extract material flows past the port of line 11 into the next downstream bed 7'. Any olefinic product passing into bed 7' is adsorbed by the solid adsorbent in bed 7'. The desorbent material flowing through bed 7' into bed 8' tends to flush any adsorbed paraffins that are carried within the solid when the feed line is shifted to line 8 (cycle 2).

Generally the paraffinic hydrocarbon portion of the raffinate stream not withdrawn from column 6 through the raffinate withdrawal line does not contaminate the stream of liquid flowing beyond the first downstream bed from the port of raffinate withdrawal. The same conditions apply for the olefin of the extract stream.

The above described flow of feed and desorbent streams into the column and extract and raffinate streams out of the column comprise cycle 1 of Table I; cycle 2 of Table I is then executed with the feed line switching from line 9 to 8, the raffinate line switching from line 7 to 14, the desorbent line switching from line 13 to 12, and the extract line switching from line 11 to 10. The lines are advanced in the direction of net liquid flow through the column in the valves 18, 19, 20 and 21 altering the input and output flow rates to achieve desired extract and raffinate purities.

Lines 7, 8, 9, 10, 11, 12, 13 and 14 carry different streams to and from the adsorption column during the individual cycles of operation of the flow director. For example, line 11 during cycle 1 of Table I has the extract to desorbent and to raffinate streams. To eliminate the contamination of raffinate and extract streams it is understood that a method of flushing the lines 7 through 14 is preferred. A preferred method of flushing the lines 7 through 14 is to pump desorbent material through the line immediately upstream of the feed inlet into the adsorption column as described in U.S. Pat. 3,201,491 (Stine et al.). In flushing the line immediately upstream from the feed line, the extract which eventually will be flowing out of adsorption column through a previously flushed line will not be contaminated with the feed stock components not desired in the extract. This increases product (extract) purity and favorably affects the quality of the extract material.

EXAMPLE

A type Y faujasite was prepared according to the teachings of U.S. Pat. 3,130,007. The synthetic zeolite was thoroughly washed in water to neutrality and then slurried and dried at 140° C. for about 2.5 hours to form a hard cake which was ground to form particle sizes passing through #20 and being retained on #40 U.S. Standard Sieves. The sieves were then contacted with a predetermined quantity of a given normal silver nitrate solution to exchange a portion of the sodium ions contained in the zeolite with silver ions. The silver exchanged sieves were then washed with water to remove any remaining traces of sodium nitrate. The washed sieves were dried and analyzed for silver content on a water free basis.

The quantity of silver contained in the prepared zeolites was controlled by using a predetermined quantity of a known concentration of a silver nitrate solution and assuming a stoichiometric exchange of silver and sodium ions. The silver content of prepared zeolites was varied from 1 wt. percent to 40 wt. percent of silver calculated as the element. The silver content of the zeolites stated hereinafter shall be considered on a water-free basis, that is, the weight percent of the zeolites that to silver when substantially all water present on and within the sieve has been excluded.

Three silver modified sieves were then tested in an octene-1 and decene-1 system to determine the capacity changes for these two components at differing silver contents of the sieve. The three silver contents were 3.3, 7.7 and 14.0 wt. percent of the sieve (dry basis). The capacity relationship for the three silver contents at differing temperatures were determined and are listed below.

| Percent silver on sieve | Temperature, °C. | Octene-1 capacity* | Decene-1 capacity* |
|---|---|---|---|
| 3.3 | 100 | 4.03 | 3.71 |
|  | 125 | 3.65 | 3.40 |
|  | 150 | 3.24 | 3.00 |
| 7.7 | 100 | 5.26 | 4.10 |
|  | 125 | 4.94 | 3.97 |
|  | 150 | 4.72 | 3.91 |
| 14.0 | 100 | 6.05 | 4.96 |
|  | 125 | 5.59 | 4.79 |
|  | 150 | 5.53 | 4.76 |

*Capacity measured in cc. of component adsorbed per 40 cc. of adsorbent.

As was generally assumed the increase in silver content on the sieves gave corresponding increases in the capacity and at a given silver content the capacity of the sieves for olefins was decreased with increasing temperature.

It would appear that a high silver content on the sieve coupled with low operation temperatures would be necessary to maximize the quantity of olefins removed from an olefin containing stream. When the selectivities (B) of a desorbent and a feed olefin were compared for two silver contents it was found that the lower silver content sieve gave a more favorable selectivity for suitable operation of this process. The selectivities for a desorbent-feed olefin system (octene-1 as desorbent and tetradecene-1 as feed olefin) were found to be as follows:

| Percent silver on sieve: | Selectivity,[1] octene-1/ tetradecene-1 system |
|---|---|
| 9.8 | 4.9 |
| 26.0 | 10.5 |

[1] Measured at 100° C. process temperature.

Even at the 9.8% silver selectivity of 4.9 the desorbent (octene-1) is held too strongly on the sieve to be displaced easily by the feed olefin (tetradecene-1). Under similar conditions using a 9.7% silver sieve and a diisobutylene-desorbent, a selectivity of 1.14 for the diisobutylene-tetradecene-1 system was found. This selectivity indicates that the tenacity of the adsorbent for diisobutylene and tetradecene-1 is about equal. It is preferably in the operation of this invention that the desorbent over feed olefin selectivity be less than about 1.5.

Another desorbent tested was a mixed hexene containing 90% 2 methyl pentene-2 and 10% 2 methyl pentene-1. The selectivity of this desorbent over decene-1 was about 1.2 at 100° C. using a sieve containing about 9.7 wt. percent silver. This desorbent in addition to having a relatively good selectivity was stable when refluxed over the silver sieve for prolonged periods of time.

Stability of the desorbent and feed olefin is an important consideration in this process. Polymerization of the feed olefin greatly reduces the yield of extract olefins and is likely to cause some damage to the adsorbent. The desorbent stability requirement also is required to prevent damage to the adsorbent from polymerized desorbent.

A $C_{11}$ through $C_{14}$ dehydrogenation reactor effluent was used as a feed in a series of separation experiments used to verify the ability of a selected adsorbent to selectively separate a mixture of olefins for the process of this invention. The dehydrogenation reactor effluent composition was as follows:

Dehydrogenation reactor effluent.—Gas-liquid chromatographic analysis

| | Weight percent |
|---|---|
| n-$C_{10}$ paraffin | 0.1 |
| n-$C_{11}$ paraffin | 24.9 |
| n-$C_{11}$ olefin | 1.8 |
| n-$C_{12}$ paraffin | 27.8 |
| n-$C_{12}$ olefin | 2.6 |
| n-$C_{13}$ paraffin | 22.6 |
| n-$C_{13}$ olefin | 2.7 |
| n-$C_{14}$ paraffin | 12.1 |
| n-$C_{14}$ olefin | 1.7 |
| $C_{15}$ paraffin | 0.4 |
| Total normal olefin | 8.8 |
| Total normal paraffin | 87.9 |
| Total non-normals | 3.3 |

| | Vol. percent |
|---|---|
| Total olefins | 9.8 |
| Light ends | 0.2 |
| Total paraffins | 86.5 |
| Total non-normals | 3.5 |

The dehydrogenation reactor effluent was passed through a bed of 320 cc. of adsorbent at a pressure of 300 p.s.i.g. and a temperature of 100° C. The adsorbent was similar to the adsorbent described in Example I and contained about 8.5 wt. percent of silver. After the adsorbent appeared to be fully loaded with the olefins from the dehydrogenation reactor effluent a flush streams of iso and normal pentane was passed through the adsorbent bed to flush away paraffins remaining in the interstitial voids. After the paraffins from the dehydrogenation reactor effluent were removed a desorbent (normal octene-1) was passed through the adsorbent bed to remove the selectively sorbed olefins. The interstitial flush was used only because in this experiment it was not possible to perform the separation using an adsorption column as disclosed in the process of this invention. (In the adsorption column as previously described in the description of the attached figure the paraffins present in the interstitial voids between the particles of adsorbent would be flushed out by desorbent material.) The desorbent material was then separated from the desorbed $C_{11}$ through $C_{14}$ olefins by fractionation and the $C_{11}$ through $C_{14}$ olefins material was analyzed. The above sequence of operations was repeated until the experiment was terminated. Analysis of the $C_{11}$ through $C_{14}$ olefins gave the following data:

|  | Runs | | |
| --- | --- | --- | --- |
|  | I | II | III |
| Total volume of effluent material fed to adsorbent bed, cc. | 2,384 | 2,072 | 1,977 |
| Purity of olefin material recovered, vol. percent olefins | 98.0 | 98.6 | 98.8 |
| Hydrocarbon distribution of olefinic material recovered, vol. percent: | | | |
| n-$C_{10}$ paraffins | 0.3 | 0.2 | 0.2 |
| $C_{10}$ monoolefins | 6.6 | 5.7 | 6.0 |
| n-$C_{11}$ paraffins | 0.4 | 0.2 | 0.2 |
| $C_{11}$ monoolefins +$C_{10}$ diolefins | 23.6 | 23.3 | 24.9 |
| n-$C_{12}$ paraffins | 0.3 | 0.2 | 0.2 |
| $C_{12}$ monoolefins +$C_{11}$ diolefins | 30.5 | 28.4 | 30.5 |
| n-$C_{13}$ paraffins | 0.3 | 0.1 | 0.2 |
| $C_{13}$ monoolefins +$C_{12}$ diolefins | 25.0 | 28.2 | 25.4 |
| n-$C_{14}$ paraffins | 0.6 | 0.8 | 0.4 |
| $C_{14}$ monoolefins +$C_{13}$ diolefins | 12.4 | 12.9 | 12.0 |

In a similar manner as described above a sodium type Y faujasite was tested for separation ability of the dehydrogenation reactor effluent. Data from this experiment were as follows:

Total volume of effluent, material fed to adsorbent bed, cc. _____ 2595
Purity of olefinic material recovered, volume percent olefins _____ 17.4

Hydrocarbon distribution of olefinic material recovered, volume percent n-$C_{10}$ paraffins _____ Trace
$C_{10}$ monoolefins _____ --
n-$C_{11}$ paraffins _____ 4.7
$C_{11}$ monoolefins+$C_{10}$ diolefins _____ 0.5
n-$C_{12}$ paraffins _____ 32.7
$C_{12}$ monoolefins+$C_{11}$ diolefins _____ 5.9
n-$C_{13}$ paraffins _____ 29.7
$C_{13}$ monoolefins+$C_{12}$ diolefins _____ 7.3
n-$C_{14}$ paraffins _____ 15.1
$C_{14}$ monoolefins+$C_{13}$ diolefins _____ 4.1

Preferred olefins in the feed charged to the adsorption columns are the normal monoolefins in the $C_{10}$ through $C_{20}$ carbon range. Of these olefins the $C_{10}$ through $C_{15}$ range is particularly preferred for use in the detergent alkylate production. The $C_{10}$ through $C_{15}$ normal monoolefins are generally produced by catalytically dehydrogenating a $C_{10}$ through $C_{15}$ normal paraffin stream. The effluent stream from the dehydrogenation step generally contains about 5–25% normal olefins and requires further processing for concentrating the normal olefinic hydrocarbons.

In the separation of hydrocarbons by the method of the present invention it is desirable to choose a desorbent material that has a selectivity for desorbent over the normal olefins in the feed of less than about 1.5:1 and greater than about 0.02. In setting these limits of selectivity on the desorbent-extract olefin combination a more complete removal of the olefins in the feed is accomplished by the closeness of the tenacities of the adsorbent for the desorbent and the extract olefins. As the selectivity of the adsorbent for the desorbent over the feed normal olefins decreases it becomes apparent that a larger volume of desorbent is required to displace the adsorbed feed normal olefins from the adsorbent in zone III. The availability of desorbent by way of its constant reuse when separated from the extract and raffinate material in previously mentioned fractionation sections allows flexibility of operations in that there is substantially no restriction as to the amount of desorbent that could be used in zone III of the adsorption column of the process of this invention. However, it is preferable that a desorbent be selected that requires a minimum amount of volumetric usage in zone III and remains within the upper limit of selectivity of desorbent over feed normal olefins of less than about 1.5. At the lower limit of selectivity of 0.02 the desorbent is so much less strongly held than the feed olefins that extremely large quantities of desorbent are required in zone III of the adsorption column to desorb the selectivity sorbed olefins from the feed mixture.

It is preferable that a desorbent that satisfies the preferable selectivity when compared to the olefin being selectively removed from the feed should satisfy other considerations as to the structure of the desorbent. When the desorbent selected is an olefin it is preferred that it be a monoolefin and that the monoolefin be a non-straight chain type. Straight chain monoolefins can be used, but their selectivities as compared with the olefin being selectively removed from the feed mixture generally tend to be high indicating the desorbent as the more tenaciously held component of the two.

Branched chain monoolefin desorbents which give the preferred selectivity of desorbent over the olefin being selectively removed from the feed preferably should have the branch chains located within a close proximity of the double bond. It appears that as the olefinic double bond of the preferred non-normal monoolefin is moved farther away from the branched chain or chains that the non-normal olefins more closely resemble a normal olefin when comparing selectives to a common feed mixture olefin; the olefinic double bond tends to become more tenaciously held on the adsorbent as the branched chain is located farther away from the double bond.

Although it is preferred to limit selectivity of desorbent over the olefin being removed from the feed mixture, it is possible to utilize desorbents that do not lend themselves to the particular selectivity limitation previously suggested, these desorbent, however, place limitations on the purity of extract and raffinate streams that can be achieved.

Adsorbents which can be used in the process of this invention include faujasites, type X and Y crystalline aluminosilicates, and other zeolites having pore openings from about 6 to about 13 angstrom units. The crystalline aluminosilicate adsorbents may be ion exchanged to replace at least a portion of the cationic material present in the original lattice structure. Suitable materials which can be used in ion exchange with the zeolite include the cations of lithium, sodium, potassium, magnesium, calcium, strontium, barium, copper, silver, gold, zinc, cadmium, and mercury in the range of from about 1% to about 40% by weight, and calculated as the element, of the aluminosilicate material. When using ion exchanged zeolites substantially all of the metal present in the lattice structure is in cationic form. It is preferred to prevent reduction of the metal present in the lattice structure to a free metal state.

PREFERRED EMBODIMENTS

A broad embodiment of this invention is found in an isothermal process for separating olefins from a mixture thereof with paraffins in which said mixture is introduced through a point of feed introduction into a first zone of an adsorption column containing at least four serially inter-connected beds of adsorbent having fluid flow connecting means between adjacent beds and also between the outlet of one terminal bed and the inlet of the other terminal bed, to provide continuous fluid flow in said process; a relatively less sorbed raffinate stream comprising a paraffinic hydrocarbons is substantially simultaneously withdrawn through a point of raffinate withdrawal from said first zone, downstream from said point of feed introduction; a desorbent material is substantially simultaneously introduced through a point of desorbent introduction into a third zone immediately downstream of said second zone; an extract stream comprising a selectively sorbed component of an olefinic hydrocarbon and desorbent material is substantially simultaneously withdrawn through a point of extract withdrawal from said third zone downstream from said point of desorbent introduction; and wherein the point in said adsorption column into which said mixture is introduced is advanced in a regular manner in a downstream direction, and similiarily and equally, the points of extract and raffinate withdrawal and the point of desorbent material introduction are similarly and equally advanced; the process being further characterized in that said adsorbent in said adsorption column is a crystalline aluminosilicate molecular sieve havin pore openings from about 6 to about 13 angstrom units.

A less broad embodiment of this process of this invention resides in that the adsorption column is operated at a temperature within the range of from about 25° C. to about 150° C. and a pressure within the range of from about atmospheric to about 500 p.s.i.g., and that the separation of olefins and paraffins is effected at conditions selected to maintain liquid phase operation in said adsorption column.

We claim as our invention:

1. A process for the separation of normal olefins from a feed stock containing normal olefins and normal paraffins which comprises:
   (a) introducing said feed stock into a first zone in an adsorption column, which column effects overall fluid flow under substantially isothermal liquid phase conditions from a fourth zone through intervening serially connected third and second zones to a first zone, which column contains at least four serially-connected fixed beds of an adsorbent comprising a Type X or Type Y zeolite containing at least one metal selected from the group consisting of lithium, sodium, potassium, magnesium, calcium, strontium, barium, copper, silver, gold, zinc, cadmium and mercury, and adsorbing in said first zone at least a portion of said feed olefins and paraffins within the pores of the adsorbent;
   (b) in said second zone, located immediately upstream of said first zone, contacting said adsorbent containing said olefins and paraffins within the pores of said adsorbent with desorbent material to effect displacement of said paraffins from within the pores of the adsorbent;
   (c) at the upstream boundary of said second zone, simultaneously withdrawing an extract stream comprising at least a portion of feed olefins which have been previously desorbed in said third zone immediately upstream of said second zone;
   (d) simultaneously introducing into said third zone, a desorbent stream to effect said desorption;
   (e) at the upstream boundary of said fourth zone located immediately upstream of said third zone and in open fluid communication with said first and said third zones, simultaneously withdrawing a relatively less selectively sorbed raffinate stream comprising at least a portion of said paraffins; and
   (f) periodically and simultaneously advancing the points of introduction of said feed stream and said desorbent, and the points of withdrawal of said extract stream and said raffinate stream, one bed length in a downstream direction.

2. The process of claim 1 further characterized in that said metal is potassium or copper.

3. The process of claim 1 further characterized in that said olefins contain from about 10 to about 20 carbon atoms per molecule.

4. The process of claim 3 further characterized in that said desorbent material is recovered from the raffinate and extract streams in individual separation steps and that at least a portion of said recovered desorbent is recycled to the third zone of said adsorption column.

5. The process of claim 4 further characterized in that the adsorption column is operated at a temperature within the range of from about 25° C. to about 150° C. and a pressure within the range of from about atmospheric to about 500 p.s.i.g.

6. The process of claim 5 further characterized in that said olefins are straight chain hydrocarbons.

7. The process of claim 5 further characterized in that said olefins are branched chain hydrocarbons.

8. The process of claim 5 further characterized in that said desorbent material boils in a temperature range below the boiling range of said feedstock.

9. The process of claim 5 further characterized in that the selectivity of the adsorbent for the desorbent over the olefin in the feed mixture is within the range of from about 1.5 to about 0.02.

10. The process of claim 6 further characterized in that said desorbent comprises a branched chain olefinic hydrocarbon.

11. The process of claim 10 further characterized in that said desorbent comprises a monoolefin.

12. The process of claim 5 further characterized in that said adsorbent contains from about 3% to about 14% by weight of silver.

13. The process of claim 5 further characterized in that said adsorbent is a synthetically prepared crystalline aluminosilicate zeolite faujasite.

14. The process of claim 10 further characterized in that said branched chain desorbent contains at least one alkyl substituted group attached to at least one of the carbon atoms that are connected by an olefinic double bond.

References Cited

UNITED STATES PATENTS

| | | | |
|---|---|---|---|
| 3,201,490 | 8/1965 | Lacey et al. | 208—310 |
| 3,218,367 | 11/1965 | Chen | 208—310 |
| 3,274,099 | 9/1966 | Broughton | 208—310 |
| 3,291,726 | 12/1966 | Broughton | 208—310 |
| 3,331,882 | 7/1967 | Mattox | 208—310 |
| 3,342,726 | 9/1967 | Mowll et al. | 208—310 |

HERBERT LEVINE, Primary Examiner

U.S. Cl. X.R.

260—676, 677